United States Patent
King (10) Patent No.: US 7,295,356 B2
(45) Date of Patent: Nov. 13, 2007

(54) METHOD FOR IMPROVED HOLOGRAPHIC RECORDING USING BEAM APODIZATION

(75) Inventor: Brian King, Longmont, CO (US)

(73) Assignee: InPhase Technologies, Inc., Longmont, CO (US)

( * ) Notice: Subject to any disclaimer, the term of this patent is extended or adjusted under 35 U.S.C. 154(b) by 235 days.

(21) Appl. No.: 10/059,242

(22) Filed: Jan. 31, 2002

(65) Prior Publication Data

US 2002/0191236 A1 Dec. 19, 2002

Related U.S. Application Data

(60) Provisional application No. 60/296,449, filed on Jun. 8, 2001.

(51) Int. Cl.
*G03H 1/12* (2006.01)

(52) U.S. Cl. ............................. 359/11; 359/10; 359/35

(58) Field of Classification Search ................. 359/10, 359/11, 30, 35, 1
See application file for complete search history.

(56) References Cited

U.S. PATENT DOCUMENTS

| | | | | |
|---|---|---|---|---|
| 3,560,072 A | 2/1971 | Silverman | ..................... | 359/11 |
| 3,567,305 A | 3/1971 | Collier et al. | ................. | 359/11 |
| 3,674,331 A | 7/1972 | Caulfield | ..................... | 359/25 |
| 3,813,685 A | 5/1974 | St. John | ..................... | 348/41 |
| 3,964,032 A | 6/1976 | Bardos | ..................... | 365/125 |
| 4,007,481 A | 2/1977 | St. John | ..................... | 348/41 |
| 4,013,338 A | 3/1977 | Sato et al. | ..................... | 359/29 |
| 4,469,407 A * | 9/1984 | Cowan et al. | ............... | 359/888 |
| 4,478,490 A | 10/1984 | Wreede et al. | ................ | 359/28 |
| 4,834,476 A * | 5/1989 | Benton | ..................... | 359/23 |
| 5,007,690 A * | 4/1991 | Chern et al. | ..................... | 359/11 |
| 5,011,244 A | 4/1991 | Smith et al. | ..................... | 359/22 |
| 5,016,950 A * | 5/1991 | Smith | ..................... | 359/15 |
| 5,675,437 A * | 10/1997 | Hart et al. | ..................... | 359/566 |
| 5,703,705 A | 12/1997 | Curtis et al. | ..................... | 359/22 |
| 5,844,701 A | 12/1998 | Campbell et al. | ............... | 359/25 |
| 5,850,300 A * | 12/1998 | Kathman et al. | ............... | 359/9 |
| 5,920,536 A | 7/1999 | Campbell et al. | ............... | 369/103 |
| 5,995,676 A | 11/1999 | Campbell et al. | ............... | 382/270 |
| 6,061,154 A | 5/2000 | Campbell et al. | ............... | 359/32 |
| 6,103,454 A * | 8/2000 | Dhar et al. | ..................... | 430/290 |
| 6,140,660 A | 10/2000 | Mermelstein | ............... | 250/550 |
| 6,295,168 B1 * | 9/2001 | Hoffnagle et al. | ............ | 359/708 |

FOREIGN PATENT DOCUMENTS

JP 355006333 A 1/1980

OTHER PUBLICATIONS

M. A. Neifeld, M. McDonald, 'Technique for controlling cross-talk noise in volume holography', Opt. Lett., vol. 21, No. 16, Aug. 15, 1996, pp. 1298-1300.*

B. M. King, M. A. Neifeld, X. Chen, 'Improved multiplexing density in volume holographic memories through beam apodization', Proc. SPIE, vol. 4089, Jun. 18-23, 2000, pp. 132-137.*

* cited by examiner

*Primary Examiner*—A. C. Lavarias
(74) *Attorney, Agent, or Firm*—Morrison & Foerster LLP (57) ABSTRACT

An apodization system for achieving a substantially uniform intensity profile of a modulated reference beam on a holographic recording medium. The substantially uniform intensity profile serves to improve the quality of any and all recorded holograms. In high-density holographic storage, the apodization system reduces the required hologram extent while still, maintaining any fidelity constraints (power budget, imaging tolerances, error-rate, noise floor). Furthermore, in high-fidelity holographic storage, better control of the hologram recording parameters can be established. The improved control allows tighter specifications on the image quality to be achieved.

16 Claims, 6 Drawing Sheets

METHOD FOR IMPROVED HOLOGRAPHIC RECORDING USING BEAM APODIZATION

RELATED APPLICATIONS

This application claims priority from Provisional Application Ser. No. 60/296,449, filed Jun. 8, 2001, entitled "METHOD FOR IMPROVED HOLOGRAPHIC RECORDING USING BEAM APODIZATION," the entire disclosure of which is incorporated herein by reference.

FIELD OF THE INVENTION

The present invention relates to a method suitable for holographic data storage systems (HDSS) using beam apodization. More specifically, this invention relates to a method for producing a modulated reference beam having a substantially uniform intensity profile on a region of a holographic recording medium.

BACKGROUND

In holographic data storage, a data-bearing object wave is overlapped with a reference beam inside a photosensitive media. Typically, the interference pattern generated by the object and reference beams modulates the material index of refraction throughout the media resulting in a phase hologram. Holographic storage systems are storage systems that use holographic storage media to store data. Holographic storage media take advantage of the photorefractive effect described by David M. Pepper et al., in "The Photorefractive Effect," *Scientific American*, October 1990 pages 62-74. The index of refraction in photorefractive materials can be changed by light that passes through them. By controllably changing the index of refraction in such materials, information can be stored in the photorefractive material in the form of interference patterns (or holograms). Holographic storage systems allow for high-density, high-capacity, and high-speed storage of information in holographic storage media.

The photorefractive effect occurs in specific types of crystals (most commonly seen in iron-doped lithium niobate). Another class of storage materials is photopolymers (light sensitive polymers). Photopolymers can also record phase holograms, but they do not do so via the photorefractive effect.

A hologram stores data in three dimensions and reads an entire page of data at one time, which is unlike an optical CD disk that stores data in two dimensions and reads a track at a time. The advantages of recording a hologram are high density (storage of hundreds of billions of bytes of data), high speed (transfer rate of a billion or more bits per second) and ability to select a randomly chosen data element in 100 microseconds or less. These advantages arise from three-dimensional recording and from simultaneous readout of an entire page of data at one time.

A hologram is a collection of patterns, also known as gratings, which are formed when two laser beams interfere with each other in a light-sensitive material (LSM) whose optical properties are altered by the intersecting beams. Before the bits of data can be imprinted in this manner in the LSM, they must be represented as a pattern of clear and opaque squares on a display such as a liquid crystal display (LCD) screen, a miniature version of the ones in laptop computers. A laser beam, for example, is shined through this crossword-puzzle-like pattern called a page, and focused by lenses to create a beam known as a signal beam. A hologram of the page of data is created when the signal beam meets another beam, called the reference beam, in the LSM. The reference beam could be collimated, which means that its electric field is phase-synchronized, with crests and troughs passing through a plane in lockstep. Such waves are known as plane waves. The grating created when the signal and reference beams meet is captured in the LSM as a modulation of the material's index of refraction.

After recording the grating, the page can be holographically reconstructed by shining the reference beam into the LSM from the same angle at which it had entered the LSM to create the hologram. As it passes through the grating in the LSM, the reference beam is diffracted in such a way that it recreates the image of the original page and the information contained on it. A reconstructed page is then projected onto a detector such as an array of electro-optical detectors that sense the light-and-dark pattern, thereby reading all the stored information on the page at once. The data can then be electronically stored, accessed or manipulated by any conventional computer.

In the typical holographic storage system, two coherent light beams are focused onto a holographic storage medium. The first coherent light beam is a signal beam, which is used to encode data. The second coherent light beam is a reference light beam. The two coherent light beams intersect within the storage medium to produce an interference pattern. The holographic storage medium records this interference pattern by changing its index of refraction to form an image of the interference pattern.

The recorded information, stored as a holographic image, can be read by illuminating the holographic image with a reference beam. When the holographic image is illuminated with a reference beam at an appropriate angle, a signal beam containing the information stored is produced. The appropriate angle for illuminating the holographic image will be the same as the angle of the reference beam used for recording the holographic image. Small deviations in the reference beam angle during readout will cause the hologram to not reconstruct. This allows many such holograms to be multiplexed in the same volume of material by using a densely spaced set of reference beam angles to record the holograms. Accordingly, high storage capacity can be obtained since the same volume can be used to store multiple holographic recordings.

Information can be encoded within the signal beam in a variety of ways. One way of encoding information into a signal beam is by passing a beam of light through an electronic mask, called a spatial-light modulator (SLM). The SLM is a two dimensional matrix of squares. Each square in the matrix can be directed to transmit light, corresponding to a binary 1, or to block light, corresponding to a binary 0. Equivalently, an SLM can be a reflective device, such that a pixel representing a binary 0 fails to reflect the incoming light, while a binary 1 strongly reflects the light. The signal beam once encoded by the SLM is focused onto the storage medium, where it intersects with a reference beam to form an interference pattern. The volumetric interference pattern records the information encoded in the signal beam to the holographic storage medium.

The information recorded in the holographic storage medium is read by illuminating the storage medium with a reference beam. The resulting signal beam is then typically focused onto a sensor such as a Charge Coupled Device (CCD) array or a CMOS camera. The abbreviation "CMOS" is derived from "complementary metal oxide semi-conductor." The sensor is attached to a decoder, which is capable of decoding the data.

A holographic storage medium includes the material within which a hologram is recorded and from which an image is reconstructed. A holographic storage medium may take a variety of forms. For example, it may comprise a film containing dispersed silver halide particles, photosensitive polymer films ("photopolymers") or a freestanding crystal such as iron-doped $LiNbO_3$ crystal. U.S. Pat. No. 6,103,454, entitled RECORDING MEDIUM AND PROCESS FOR FORMING MEDIUM, generally describes several types of photopolymers suitable for use in holographic storage media. The patent describes an example of creation of a hologram in which a photopolymer is exposed to information carrying light. A monomer polymerizes in regions exposed to the light. Due to the lowering of the monomer concentration caused by the polymerization, monomer from darker unexposed regions of the material diffuses to the exposed regions. The polymerization and resulting concentration gradient creates a refractive index change forming a hologram representing the information carried by the light.

Figure 1:
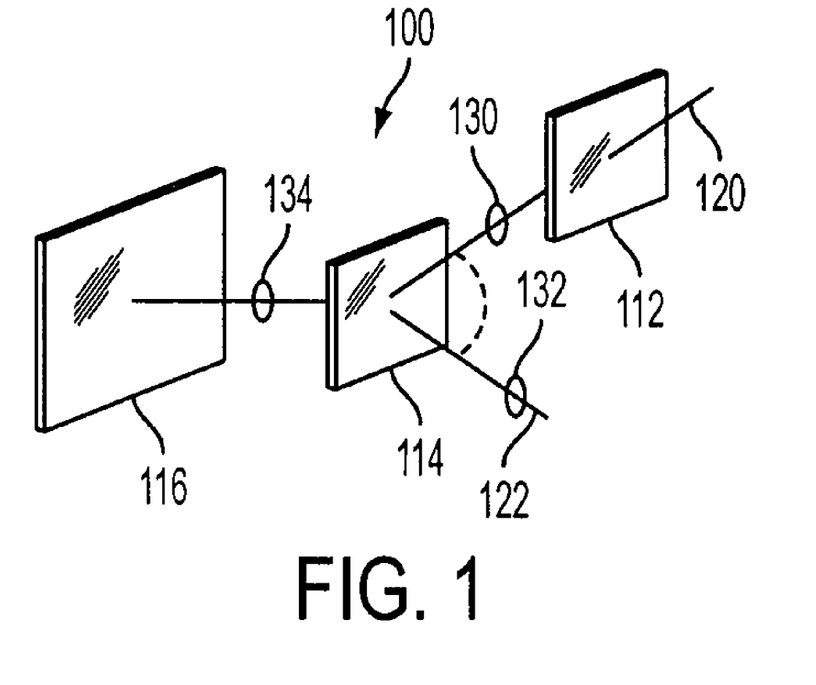
FIG. 1 shows the basic components of a holographic system.

FIG. 1 illustrates the basic components of a holographic system 100. System 100 contains a SLM 112, a holographic storage medium 114, and a sensor 116. SLM 112 encodes beam 120 with an object image. The image is stored by interfering the encoded signal beam 120 with a reference beam 122 at a location on or within holographic storage medium 114. The interference creates interference patterns (or hologram) that are captured within medium 114 as a pattern of, for example, a holographic refractive index grating.

It is possible for more than one holographic image to be stored at a single location, or for a holographic image to be stored at a single location, or for holograms to be stored in overlapping positions, by, for example, varying the angle, the wavelength, or the phase of the reference beam 122, depending on the particular reference beam employed. Signal beam 120 typically passes through lenses 130 before being intersected with reference beam 122 in the medium 114. It is possible for reference beam 122 to pass through lenses 132 before this intersection. Once data is stored in medium 114, it is possible to retrieve the data by intersecting a reference beam 122 with medium 114 at the same location and at the same angle, wavelength, or phase at which a reference beam 122 was directed during storage of the data. The reconstructed data passes through one or more lenses 134 and is detected by sensor 116. Sensor 116, is for example, a charged-coupled device or an active pixel sensor. Sensor 116 typically is attached to a unit that decodes the data.

The quality of the recorded hologram as measured by such parameters as diffraction efficiency, multiplexing selectivity, and image fidelity is directly influenced by a variety of details specific to each system implementation. However, common to many designs, the reference beam impinges on the photosensitive media at a large angle with respect to the media surface normal. When the reference beam is of a convergent and/or divergent nature, the illuminated spot on the media will be distributed unequally in intensity [Watts/$cm^2$] due to the change in solid angle subtended by different positions on the media surface. The uneven spatial intensity profile results in spatial non-uniformities of the recorded hologram reducing the hologram quality.

Laser beams that are typically used for holographic recording have a spatial intensity profile dictated by the oscillation mode of the laser resonator, with the simplest mode having a Gaussian or bell-shaped profile. Apodization or beam shaping of the reference beam is a technique that redistributes the optical power with the common goal being a uniform intensity distribution.

One method for generating a beam with a uniform (or flat) spatial profile is to simply expand a Gaussian beam and use only the center portion. However, this method trades off the power efficiency to obtain the desired flatness of illumination. For example, if an illumination flatness of 5% is required over a certain area, then typically only 5% of the incident reference beam power can actually be used. It has long been desirable in laser physics to be able to efficiently generate a laser beam with a uniform cross section. Although many ingenious solutions have been proposed, the few that have been implemented suffer from poor flatness, severe diffraction effects and distortion of the wave front, poor quality of the apodized beam, expensive production cost, and high sensitivities to misalignment of the apodizer. In addition, many solutions, including diffractive optics, create a beam that attains uniform intensity in one plane in space, but then diverges and distorts away from that plane.

Figure 2:
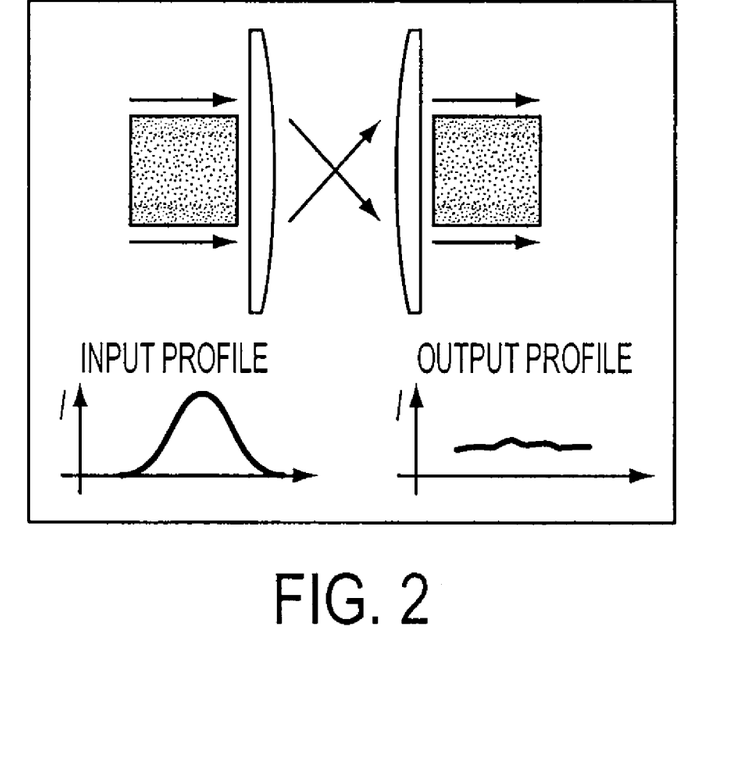
FIG. 2 shows a pair of optical elements with aspheric surfaces that distribute the power from an input beam with a Gaussian profile resulting in an output beam as shown.

J. Ashley et al. in "Holographic data storage," *IBM J. Res. Develop.* Vol. 44, No. 3, 341 (May 2000), disclose a typical aspherical apodizer. A two-element telescope with transmissive optical elements was designed that produces a relatively flat-top laser beam with the capability of propagating for several meters with little distortion and diffraction-limited wave front quality. The Gaussian-beam-to-flat-top converter utilized a convex aspheric lens to introduce aberrations into the beam and redistributed the laser power from a particular incident Gaussian profile to a relatively flattop profile. A second aspheric optic re-collimated the aberrated beam, restored the wave front quality and allowed it to propagate for long distances without spreading. As a result, only the central 60% of the output power was uniform in intensity to 2%. The input and output beam dimensions are fixed for a given apodizer. FIG. 2 shows an example of input and output intensity profiles (not showing the roll-off) measured using the apodizer of Ashley et al.

Ashley et al.'s method, however, suffers from substantial variation in intensity outside the central 60% of the output power. Therefore, there is still a need for an efficient method for correcting hologram spatial non-uniformities far more tightly to produce a reference beam having a uniform intensity.

SUMMARY OF THE INVENTION

An embodiment of this invention is a method for apodizing an incident reference beam for a holographic recording medium, comprising impinging the incident reference beam on an apodizer and producing a modulated reference beam having a substantially uniform intensity profile on a region of the holographic recording medium, wherein the incident reference beam is off-axis from the normal at a point in the region and further wherein the region could comprise an overlap of the modulated reference beam and an object beam. The incident reference beam could be selected from the group consisting of a collimated beam, a converging beam and a diverging beam. The incident reference beam could be a spherical beam. The modulated reference beam could be a spherical beam. The region could be a planar surface on or within the holographic recording medium. The holographic recording medium could be an optically flat planar medium. The incident reference beam could be a collimated beam having a substantially uniform intensity profile on a surface normal to the incident reference beam. The apodizer could comprise a transmissive mask or a diffractive apodization system. The holographic recording medium could be a holographic recording medium comprising a polymer matrix. The holographic recording medium could have a Rayleigh ratio ($R_{90°}$) less than $7 \times 10^{-3}$ cm$^{-1}$. The holographic recording medium could have a thickness greater than 200 μm and a Δn of $3 \times 10^{-3}$ or higher.

Another embodiment is an apodization system, comprising an apodizer for apodizing an incident reference beam, a holographic recording medium, and a light source for the incident reference beam and a light source for an object beam. The object beam contains encoded information and the incident reference beam could be an unmodulated beam. The apodizer could comprise a transmissive mask. The apodizer could comprise a diffractive apodization system.

Yet another embodiment is a method of computing an apodizer of an apodization system comprising the apodizer and a holographic recording medium, said method comprising ray-tracing an intensity profile relationship between an apodization plane and an associated surface in the holographic recording medium and determining an apodizer transmittance. The ray-tracing could be by geometrical optics.

Another embodiment is a method of computing an apodizer of an apodization system comprising the apodizer and a holographic recording medium, said method comprising determining an intensity profile relationship between an apodization plane and an associated surface in the holographic recording medium and determining an apodizer transmittance. This determining an intensity profile relationship is by physical optics.

As will be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

The present invention will be better understood by reference to the Detailed Description of the Invention when taken together with the attached drawings.

DETAILED DESCRIPTION OF THE INVENTION

An HDSS is composed of an optical system that directs and shapes coherent optical beams to intersect at a surface or volume where the interference pattern is recorded. The hologram constitutes the recorded pattern in the media.

In HDSS, an entire page of information is stored at once as an optical interference pattern within an optical storage material by intersecting two coherent laser beams within the optical storage material. The first beam is called the "object beam," which contains the information to be stored. The second beam is called the "reference beam." The reference beam is often (but not necessarily) an unmodulated beam, preferably a spherical beam or a collimated beam with a planar wave front.

In this invention, a reference beam is modulated by an apodizer. A reference beam before modulation by the apodizer is referred to as an "incident reference beam" and after modulation as a "modulated reference beam." In this invention, the term "apodizer" refers to any device capable of shaping an incident reference beam to produce a modulated reference beam. The incident reference beam undergoes apodizing or beam shaping.

A common trait of all holographic systems is the overlapping of two coherent beams inside a photosensitive medium. The interference pattern generated by the two beams is recorded in the material in the form of a hologram. The ratio of the intensity of the reference beam and the object beam at any point of overlap in the media controls the localized recording rate of the hologram. If the reference beam intensity varies over the media volume, then the quality of the hologram is degraded as different positions in the media record at different rates.

In this invention, the above mentioned problem is solved by the use of an apodizer, which allows a better match of the intensity profiles of the object and reference beams throughout the volume of interaction that contributes to the hologram.

With holographic systems that record holograms near a Fourier image plane, the object beam commonly contains wide spatial variations in intensity. Fourier holograms suffer from a number of problems dependent on the Fourier image of the object beam. For example, a binary amplitude SLM (0 pixels are dark, 1 pixels are bright) have a Fourier image with a DC spot (typically ~5 microns in diameter) in the center that contains 50% of the power in the object beam. The power density of the DC spot is ~1000 times stronger than the rest of the object's Fourier image. No type of apodization of the reference beam will fix this problem. In this case, one must either move the Fourier plane out of the recording intersection of the two beams or introduce a phase mask on the SLM to eliminate the DC spot. This is an example of apodizing the object beam instead of the reference beam. This invention, on the other hand, relates to apodizing a reference beam impinging on a region of a holographic medium in which the region is tilted with respect to the impinging reference beam.

Described are simple and accurate methods for apodizing or beam-shaping a reference beam in order to achieve a uniform intensity profile on a region of the holographic recording medium. In the preferred embodiments, the necessary adjustment to the reference beam can be determined by a variety of methods. The simplest approach is to use geometric optics to ray-trace the relation between the illuminating reference beam profile and the intensity profile on the media surface. The apodizer transmittance is then determined as the profile necessary to undo the effects of the geometric projection onto the media. For simple optical systems this can commonly be determined in closed mathematical form. When the results of ray-tracing are either inappropriate or do not provide enough accuracy, more complicated methods can be employed. Physical optics modeling can be used to provide the relation between the intensity profile at the apodization surface and the media surface. Physical optics numerically solves the wave propagation equation governing the propagation of the wave leaving the apodization surface and arriving at the holographic media surface. Physical optics allows very high precision to be obtained while accurately taking into account the true vectorial polarization properties of the optical wave as well as the diffraction nature of coherent light. The computational burden of physical optics may restrict the practicality of the the approach. However, physical optics includes the effects of both polarization and diffraction, which are ignored by geometric optical methods.

The apodizer of this invention can take into account any non-uniformity naturally present in the reference beam. An example of such non-uniformities is the Gaussian beam profile common to nearly all forms of lasers. When the reference beam is not collimated, the natural divergence/convergence of the beam also introduces a non-uniformity that the apodizer can correct. Regardless of the source of the non-uniform beam profile, the apodizer is such that the intensity profile within a given region on the holographic recording medium is substantially uniform.

The term "substantially uniform intensity" refers to an intensity in which the maximum and minimum intensities of a beam, $I_{max}$ and $I_{min}$, within a given region on a holographic recording medium have the following relationship:

$$(I_{max} - I_{min})/I_{max} \leq 0.1 \quad (1).$$

Preferably, $(I_{max} - I_{min})/I_{max} \leq 0.05$; more preferably, $(I_{max} - I_{min})/I_{max} \leq 0.02$; most preferably, $(I_{max} - I_{min})/I_{max} \leq 0.01$, where Imax and Imin are defined over the total volume of the media that intersects with the object beam.

Beam apodization of this invention can be implemented in a number of ways but, for convenience, the preferred ways are the following. The first preferred method imposes an absorptive mask on the beam. The transmitted beam could have an intensity profile that is the multiplication of the absorptive mask and the input beam profile. The absorptive masks provide the simplest solution at the expense of the transmitted power efficiency. The absorptive mask apodizers eliminate all the power that is not part of the desired beam shape. As a result, absorptive apodizers typically only pass 20%-90% of the input beam power.

The second preferred apodization technique uses diffractive optics to redistribute the optical energy in the beam. Diffractive optics provide beam shaping with zero or very low loss of transmitted power through the use of a sophisticated (possibly multi-element) optical system.

In one aspect of the invention, the holographic recording medium is an optically flat recording medium. The term "optically flat recording medium" refers to the property that the effective medium thickness is controlled such that thickness deviations are less than a wavelength of light across the medium area addressed during recording.

Many kinds of materials could be used as holographic storage media. Photopolymers are very promising because of their high sensitivity and dynamic range. Phenanthrenequinone-doped polymethylmethacrylate (PQ/PMMA) has excellent optical quality and is based on a photoreaction between the dopant and polymer followed by diffusion of unreacted chromophore.

In one aspect of the invention, the optical article, e.g., holographic recording medium, of the invention is formed by steps including mixing a matrix precursor and a photoactive monomer, and curing the mixture to form the matrix in situ. The matrix precursor and photoactive monomer are selected such that (a) the reaction by which the matrix precursor is polymerized during the cure is independent from the reaction by which the photoactive monomer will be polymerized during writing of a pattern, e.g., data, and (b) the matrix polymer and the polymer resulting from polymerization of the photoactive monomer (the photopolymers) are compatible with each other. The matrix is considered to be formed when the photorecording material, i.e., the matrix material plus the photoactive monomer, photoinitiator, and/or other additives, exhibits an elastic modulus of at least about $10^5$ Pa, generally about $10^5$ Pa to about $10^9$ Pa, advantageously about $10^6$ Pa to about $10^8$ Pa.

The compatibility of the matrix polymer and photopolymers tend to prevent large-scale (>100 nm) phase separation of the components, such large-scale phase separation typically leading to undesirable haziness or opacity. Utilization of a photoactive monomer and a matrix precursor that polymerize by independent reactions provides a cured matrix substantially free of cross-reaction, i.e., the photoactive monomer remains substantially inert during the matrix cure. In addition, due to the independent reactions, there is no inhibition of subsequent polymerization of the photoactive monomer. At least one photoactive monomer contains one or more moieties, excluding the monomer functional groups, that are substantially absent from the polymer matrix, i.e., it is possible to find a moiety in the photoactive monomer such that no more than 20% of all such moieties in the photorecording material are present, i.e., covalently bonded, in the matrix. The resulting optical article is capable of exhibiting desirable refractive index contrast due to the independence of the matrix from the photoactive monomer.

The formation of a hologram, waveguide, or other optical article relies on a refractive index contrast (Δn) between exposed and unexposed regions of a medium, this contrast at least partly due to monomer diffusion to exposed regions. High index contrast is desired because it provides improved signal strength when reading a hologram, and provides efficient confinement of an optical wave in a waveguide. One way to provide high index contrast in the invention is to use a photoactive monomer having moieties (referred to as index-contrasting moieties) that are substantially absent from the matrix, and that exhibit a refractive index substantially different from the index exhibited by the bulk of the matrix. For example, high contrast would be obtained by using a matrix that contains primarily aliphatic or saturated alicyclic moieties with a low concentration of heavy atoms and conjugated double bonds (providing low index) and a photoactive monomer made up primarily of aromatic or similar high-index moieties.

The matrix is a solid polymer formed in situ from a matrix precursor by a curing step (curing indicating a step of inducing reaction of the precursor to form the polymeric matrix). It is possible for the precursor to be one or more monomers, one or more oligomers, or a mixture of monomer and oligomer. In addition, it is possible that more than one type of precursor functional group can exist, either on a single precursor molecule or in a group of precursor molecules. (Precursor functional groups are the group or groups on a precursor molecule that are the reaction sites for polymerization during matrix cure.) To promote mixing with the photoactive monomer, the precursor is advantageously liquid at some temperature between about −50° C. and about 80° C. Advantageously, the matrix polymerization is capable of being performed at room temperature. Also advantageously, the polymerization is capable of being performed in a time period less than 5 minutes. The glass transition temperature ($T_g$) of the photorecording material is advantageously low enough to permit sufficient diffusion and chemical reaction of the photoactive monomer during a holographic recording process. Generally, the $T_g$ is not more than 50° C. above the temperature at which holographic recording is performed, which, for typical holographic recording, means a $T_g$ between about 80° C. and about −130° C. (as measured by conventional methods).

Examples of polymerization reactions contemplated for forming matrix polymers in the invention include cationic epoxy polymerization, cationic vinyl ether polymerization, cationic alkenyl ether polymerization, cationic allene ether polymerization, cationic ketene acetal polymerization, epoxy-amine step polymerization, epoxy-mercaptan step polymerization, unsaturated ester-amine step polymerization (via Michael addition), unsaturated ester-mercaptan step polymerization (via Michael addition), vinyl-silicon hydride step polymerization (hydrosilylation), isocyanate-hydroxyl step polymerization (urethane formation), and isocyanatae-amine step polymerization (urea formation).

Several such reactions are enabled or accelerated by suitable catalysts. For example, cationic epoxy polymerization takes place rapidly at room temperature by use of $BF_3$-based catalysts, other cationic polymerization proceed in the presence of protons, epoxy-mercaptan reactions and Michael additions are accelerated by bases such as amines, hydrosilylation proceeds rapidly in the presence of transition metal catalysts such as platinum, and urethane and urea formation proceed rapidly when tin catalysts are employed. It is also possible to use photogenerated catalysts for matrix formation, provided that steps are taken to prevent polymerization of the photoactive monomer during the photogeneration.

The photoactive monomer is any monomer or monomers capable of undergoing photoinitiated polymerization, and which, in combination with a matrix material, meets the polymerization reaction and compatibility requirements of the invention. Suitable photoactive monomers include those that polymerize by a free-radical reaction, e.g., molecules containing ethylenic unsaturation such as acrylates, methacrylates, acrylamides, methacrylamides, styrene, substituted styrenes, vinyl naphthalene, substituted vinyl naphthalenes, and other vinyl derivatives. Free-radical copolymerizable pair systems such as vinyl ether mixed with maleate and thiol mixed with olefin are also suitable. It is also possible to use cationically polymerizable systems such as vinyl ethers, alkenyl ethers, allene ethers, ketene acetals, and epoxies. It is also possible for a single photoactive monomer molecule to contain more than one monomer functional group. As mentioned previously, relatively high index contrast is desired in the article of the invention, whether for improved readout in a recording media or efficient light confinement in a waveguide. In addition, it is advantageous to induce this relatively large index change with a small number of monomer functional groups, because polymerization of the monomer generally induces shrinkage in a material.

Such shrinkage has a detrimental effect on the retrieval of data from stored holograms, and also degrades the performance of waveguide devices such as by increased transmission losses or other performance deviations. Lowering the number of monomer functional groups that must be polymerized to attain the necessary index contrast is therefore desirable. This lowering is possible by increasing the ratio of the molecular volume of the monomers to the number of monomer functional groups on the monomers. This increase is attainable by incorporating into a monomer larger index-contrasting moieties and/or a larger number of index-contrasting moieties. For example, if the matrix is composed primarily of aliphatic or other low index moieties and the monomer is a higher index species where the higher index is imparted by a benzene ring, the molecular volume could be increased relative to the number of monomer functional groups by incorporating a naphthalene ring instead of a benzene ring (the naphthalene having a larger volume), or by incorporating one or more additional benzene rings, without increasing the number of monomer functional groups. In this manner, polymerization of a given volume fraction of the monomers with the larger molecular volume/monomer functional group ratio would require polymerization of less monomer functional groups, thereby inducing less shrinkage. But the requisite volume fraction of monomer would still diffuse from the unexposed region to the exposed region, providing the desired refractive index.

The molecular volume of the monomer, however, should not be so large as to slow diffusion below an acceptable rate. Diffusion rates are controlled by factors including size of diffusing species, viscosity of the medium, and intermolecular interactions. Larger species tend to diffuse more slowly, but it would be possible in some situations to lower the viscosity or make adjustments to the other molecules present in order to raise diffusion to an acceptable level. Also, in accord with the discussion herein, it is important to ensure that larger molecules maintain compatibility with the matrix.

Numerous architectures are possible for monomers containing multiple index-contrasting moieties. For example, it is possible for the moieties to be in the main chain of a linear oligomer, or to be substituents along an oligomer chain. Alternatively, it is possible for the index-contrasting moieties to be the subunits of a branched or dendritic low molecular weight polymer.

The preferred acrylate monomers are monofunctional. These include 2,4,6-tribromophenylacrylate, pentabromoacrylate, isobornylacrylate, phenylthioethyl acrylate tetrahydrofurfurylacrylate, 1-vinyl-2-pyrrolidinone, asymmetric bis thionapthyl acrylate, 2-phenoxyethylacrylate, and the like.

In addition to the photoactive monomer, the optical article typically contains a photoinitiator (the photoinitiator and photoactive monomer being part of the overall photoimageable system). The photoinitiator, upon exposure to relatively low levels of the recording light, chemically initiates the polymerization of the monomer, avoiding the need for direct light-induced polymerization of the monomer. The photoinitiator generally should offer a source of species that initiate polymerization of the particular photoactive monomer. Typically, 0.1 to 20-wt. % photoinitiator, based on the weight of the photoimageable system, provides desirable results.

A variety of photoinitiators known to those skilled in the art and available commercially are suitable for use in the invention. It is advantageous to use a photoinitiator that is sensitive to light in the visible part of the spectrum, particularly at wavelengths available from conventional laser sources, e.g., the blue and green lines of Ar+ (458, 488, 514 nm) and He—Cd lasers (442 nm), the green line of frequency doubled YAG lasers (532 nm), and the red lines of He—Ne (633 nm) and Kr+ lasers (647 and 676 nm). One advantageous free radical photoinitiator is bis(η-5-2,4-cyclopentadien-1-yl) bis[2,6-difluoro-3-(1H-pyrrol-1-yl)phenyl]titanium, available commercially from Ciba as CGI-784. Another visible free-radical photoinitiator (which requires a co-initiator) is 5,7,diiodo-3-butoxy-6-fluorone, commercially available from Spectra Group Limited as H-Nu 470. Free-radical photoinitiators of dye-hydrogen donor systems are also possible. Examples of suitable dyes include eosin, rose bengal, erythrosine, and methylene blue, and suitable hydrogen donors include tertiary amines such as n-methyl diethanol amine. In the case of cationically polymerizable monomers, a cationic photoinitiator is used, such as a sulfonium salt or an iodonium salt. These cationic photoinitiator salts absorb predominantly in the UV portion of the spectrum, and are therefore typically sensitized with a dye to allow use of the visible portion of the spectrum. An example of an alternative visible cationic photoinitiator is ($\eta_5$-2,4-cyclopentadien-1-yl) ($\eta_6$-isopropylbenzene)-iron(II) hexafluorophosphate, available commercial from Ciba as Irgacure 261. It is also conceivable to use other additives in the photoimageable system, e.g., inert diffusing agents having relatively high or low refractive indices.

Preferably, the photoinitiators are selected according to their sensitivity to the light sources. For example, Irgacure 369, Irgacure 819, and Irgacure 907 are suitable for commercial blue laser systems. CGI-784 is suitable for green laser systems, and CB-650 is suitable for red laser systems. Irgacure and CGI are available from Ciba, CB-650 from Spectra Group.

Advantageously, for holographic recording, the matrix is a polymer formed by mercaptan-epoxy step polymerization, more advantageously a polymer formed by mercaptan-epoxy step polymerization having a polyether backbone. The polyether backbone offers desirable compatibility with several useful photoactive monomers, particularly vinyl aromatic compounds. Specifically, photoactive monomers selected from styrene, bromostyrene, divinyl benzene, and 4-methylthio-1-vinylnaphthalene (MTVN) have been found to be useful with matrix polymers formed by mercaptan-epoxy step polymerization and having a polyether backbone. A monomer that has more than one index-contrasting moiety and that is also useful with these polyether matrix polymers is 1-(3-(naphth-1-ylthio)propylthio)-4-vinylnaphthalene.

To be independent, the polymerization reactions for the matrix precursor and the photoactive monomer are selected such that: (a) the reactions proceed by different types of reaction intermediates, (b) neither the intermediate nor the conditions by which the matrix is polymerized will induce substantial polymerization of the photoactive monomer functional groups, and (c) neither the intermediate nor the conditions by which the matrix is polymerized will induce a non-polymerization reaction of the monomer functional groups that causes cross-reaction (between the monomer functional groups and the matrix polymer) or inhibits later polymerization of the monomer functional groups. According to item (a), if a matrix were polymerized by use of an ionic intermediate, it would be suitable to polymerize the photoactive monomer by use of a free radical reaction. In accordance with item (b), however, the ionic intermediate should not induce substantial polymerization of the photoactive monomer functional groups. Also in accordance with item (b), for example, one must be aware that a photoinitiated free radical matrix polymerization will typically induce a photoinitiated cationic polymerization of a photoactive monomer functional group. Thus, two otherwise independent reactions are not independent for purposes of the invention if both are driven by a single reaction condition. In accordance with item (c), for example, base-catalyzed matrix polymerization should not be performed when the photoactive monomer functional group undergoes a non-polymerization reaction in response to the base, even if polymerization of the monomer functional group is performed by an independent reaction. A specific example is that a base-catalyzed epoxy-mercaptan polymerization should not be used with an acrylate monomer because, although the acrylate is polymerized by a free radical reaction, the acrylate will react with the mercaptans under base catalysis, resulting in a cross-reaction.

Table 1 below illustrates some examples of matrix/photoactive monomer combinations where the matrix polymerization reaction and photoactive monomer polymerization are capable of being independent, and examples where the polymerization interfere with each other. (Photoactive monomers are horizontal, and matrix polymers are vertical. "X" indicates cross-reaction or monomer polymerization during matrix polymerization. "O" indicates independent reactions. "I" indicates that the photoactive monomer polymerization is inhibited by the reagents or reaction that form the polymeric matrix, e.g., the photoactive monomer functional group is converted to a non-polymerizing group, or chemical species are present after the matrix cure that substantially slow the rate or yield of polymerization of the monomer functional groups.)

TABLE 1

| | (Meth) acrylates | Styrene Derivatives | Vinyl Ethers | Epoxies |
|---|---|---|---|---|
| Cationic Epoxy | O | O | X | X |
| Cationic Vinyl Ethers | O | O | X | X |
| Epoxy (amine) | X | O | I | X |
| Epoxy (mercaptan) | X | O | I | X |
| Unsaturated ester (amine) | X | O | I | X |
| Unsaturated ester (mercaptan) | X | O | I | X |
| Hydrosilylation | X | X | X | O |
| Urethane formation | O | O | O | X |

For purposes of the invention, polymers are considered to be compatible if a blend of the polymers is characterized, in 90° light scattering, by a Rayleigh ratio ($R_{90°}$) less than $7 \times 10^{-3}$ cm$^{-1}$. The Rayleigh ratio, $R_\theta$, is a conventionally known property, and is defined as the energy scattered by a unit volume in the direction θ, per steradian, when a medium is illuminated with a unit intensity of unpolarized light, as discussed in M. Kerker, *The Scattering of Light and Other Electromagnetic Radiation*, Academic Press, San Diego, 1969. The light source used for the measurement is generally a laser having a wavelength in the visible part of the spectrum. Normally, the wavelength intended for use in writing holograms is used. The scattering measurements are made upon a photorecording material that has been flood exposed. The scattered light is collected at an angle of 90° from the incident light, typically by a photodetector. It is possible to place a narrow band filter, centered at the laser wavelength, in front of such a photodetector to block fluorescent light, although such a step is not required. The Rayleigh ratio is typically obtained by comparison to the energy scatter of a reference material having a known Rayleigh ratio.

Polymer blends that are considered to be miscible, e.g., according to conventional tests such as exhibition of a single glass transition temperature, will typically be compatible as well, i.e., miscibility is a subset of compatibility. Standard miscibility guidelines and tables are there from useful in selecting a compatible blend. However, it is possible for polymer blends that are immiscible to be compatible according to the light scattering test above.

A polymer blend is generally considered to be miscible if the blend exhibits a single glass transition temperature, $T_g$, as measured by conventional methods. An immiscible blend will typically exhibit two glass transition temperatures corresponding to the $T_g$ values of the individual polymers. $T_g$ testing is most commonly performed by differential scanning calorimetry (DSC), which shows the $T_g$ as a step change in the heat flow (typically the ordinate). The reported $T_g$ is typically the temperature at which the ordinate reaches the mid-point between extrapolated baselines before and after the transition. It is also possible to use Dynamic Mechanical Analysis (DMA) to measure $T_g$. DMA measures the storage modulus of a material, which drops several orders of magnitude in the glass transition region. It is possible in certain cases for the polymers of a blend to have individual $T_g$ values that are close to each other. In such cases, conventional methods for resolving such overlapping $T_g$ should be used, such as discussed in Brinke et al., "The thermal characterization of multi-component systems by enthalpy relaxation," *Thermochimica Acta.,* 238 (1994), at 75.

Matrix polymer and photopolymers that exhibit miscibility are capable of being selected in several ways. For example, several published compilations of miscible polymers are available, such as O. Olabisi et al, *Polymer-Polymer Miscibility*, Academic Press, New York, 1979; L. M. Robeson, *MMI, Press Symp. Ser.,* 2, 177, 1982; L. A. Utracki, *Polymer Alloys and Blends: Thermodynamics and Rheology*, Hanser Publishers, Munich, 1989; and S. Krause in *Polymer Handbook*, J. Brandrup and E. H. Immergut, Eds., 3rd Ed., Wiley Interscience, New York, 1989, pp. VI 347-370, the disclosures of which are hereby incorporated by reference. Even if a particular polymer of interest is not found in such references, the approach specified allows determination of a compatible photorecording material by employing a control sample.

Determination of miscible or compatible blends is further aided by intermolecular interaction considerations that typically drive miscibility. For example, it is well known that polystyrene and poly (methylvinylether) are miscible because of an attractive interaction between the methyl ether group and the phenyl ring. It is therefore possible to promote miscibility, or at least compatibility, of two polymers by using a methyl ether group in one polymer and a phenyl group in the other polymer. It has also been demonstrated that immiscible polymers are capable of being made miscible by the incorporation of appropriate functional groups that can provide ionic interactions. (See Z. L. Zhou and A. Eisenberg, *J. Polym. Sci., Polym. Phys. Ed.,* 21 (4), 595, 1983; R. Murali and A. Eisenberg, *J. Polym. Sci., Part B: Polym. Phys.,* 26 (7), 1385, 1988; and A Natansohn et al., *Makromol. Chem., Macromol. Symp.,* 16, 175, 1988). For example polyisoprene and polystyrene are immiscible. However, when polyisoprene is partially sulfonated (5%), and 4-vinyl pyridine is copolymerized with the polystyrene, the blend of these two functionalized polymers is miscible. It is contemplated that the ionic interaction between the sulfonated groups and the pyridine group (proton transfer) is the driving force that makes this blend miscible. Similarly, polystyrene and poly (ethyl acrylate), which are normally immiscible, have been made miscible by lightly sulfonating the polystyrene. (See R. E. Taylor-Smith and R. A. Register, *Macromolecules,* 26, 2802, 1993.) Charge-transfer has also been used to make miscible polymers that are otherwise immiscible. For example it has been demonstrated that, although poly(methyl acrylate) and poly(methyl methacrylate) are immiscible, blends in which the former is copolymerized with (N-ethylcarbazol-3-yl)methyl acrylate (electron donor) and the latter is copolymerized with 2-[(3,5-dinitrobenzoyl)oxy]ethyl methacrylate (electron acceptor) are miscible, provided the right amounts of donor and acceptor are used. (See M. C. Piton and A. Natansohn, *Macromolecules,* 28, 15, 1995.) Poly(methyl methacrylate) and polystyrene are also capable of being made miscible using the corresponding donon-acceptor co-monomers (See M. C: Piton and A. Natanshon, *Macromolecules,* 28, 1605, 1995).

A variety of test methods exist for evaluating the miscibility or compatibility of polymers, as reflected in the recent overview published in A. Hale and H. Bair, Ch. 4-"Polymer Blends and Block Copolymers," *Thermal Characterization of Polymeric Materials,* 2nd Ed., Academic Press, 1997. For example, in the realm of optical methods, opacity typically indicates a two-phase material, whereas clarity generally indicates a compatible system. Other methods for evaluating miscibility include neutron scattering, infrared spectroscopy (IR), nuclear magnetic resonance (NMR), x-ray scattering and diffraction, fluorescence, Brillouin scattering, melt titration, calorimetry, and chemilluminescence. See, for example, L. Robeson, supra; S. Krause, *Chemtracts—Macromol. Chem.,* 2, 367, 1991a; D. Vessely in *Polymer Blends and Alloys,* M. J. Folkes and P. S. Hope, Eds., Blackie Academic and Professional, Glasgow, pp. 103-125; M. M. Coleman et al. *Specific Interactions and the Miscibility of Polymer Blends,* Technomic Publishing, Lancaster, Pa., 1991; A. Garton, *Infrared Spectroscopy of Polymer Blends, Composites and Surfaces,* Hanser, N.Y., 1992; L. W. Kelts et al., *Macromolecules,* 26, 2941, 1993; and J. L. White and P. A. Mirau, *Macromolecules,* 26, 3049, 1993; J. L. White and P. A. Mirau, *Macromolecules,* 27, 1648, 1994; and C. A. Cruz et al., *Macromolecules,* 12, 726, 1979; and C. J. Landry et al., *Macromolecules,* 26, 35, 1993.

Compatibility has also been promoted in otherwise incompatible polymers by incorporating reactive groups into the polymer matrix, where such groups are capable of reacting with the photoactive monomer during the holographic recording step. Some of the photoactive monomer will thereby be grafted onto the matrix during recording. If there are enough of these grafts, it is possible to prevent or reduce phase separation during recording. However, if the refractive indexes of the grafted moiety and of the monomer are relatively similar, too many grafts, e.g., more than 30% of monomers grafted to the matrix, will tend to undesirably reduce refractive index contrast.

A holographic recording medium of the invention is formed by adequately supporting the photorecording material, such that holographic writing and reading is possible. Typically, fabrication of the medium involves depositing the matrix precursor/photoimageable system mixture between two plates using, for example, a gasket to contain the mixture. The plates are typically glass, but it is also possible to use other materials transparent to the radiation used to write data, e.g., a plastic such as polycarbonate or poly (methyl methacrylate). It is possible to use spacers between the plates to maintain a desired thickness for the recording medium. During the matrix cure, it is possible for shrinkage in the material to create stress in the plates, such stress altering the parallelism and/or spacing of the plates and thereby detrimentally affecting the medium's optical properties. To reduce such effects, it is useful to place the plates in an apparatus containing mounts, e.g., vacuum chucks, capable of being adjusted in response to changes in parallelism and/or spacing. In such an apparatus, it is possible to monitor the parallelism in real-time by use of a conventional interferometric method, and make any necessary adjustments during the cure. Such a method is discussed, for example, in U.S. patent application Ser. No. 08/867,563, now U.S. Pat. No. 5.932.045. issued Aug. 3. 1999, the disclosure of which is hereby incorporated by reference. The photorecording material of the invention is also capable of being supported in other ways. For instance, it is conceivable to dispose the matrix precursor/photoimageable system mixture into the pores of a substrate, e.g., a nanoporous glass material such as Vycor, prior to matrix cure. More conventional polymer processing is also envisioned, e.g., closed mold formation or sheet extrusion. A stratified medium is also contemplated, i.e., a medium containing multiple substrates, e.g., glass, with layers of photorecording material disposed between the substrates.

The medium of the invention is then capable of being used in a in a holographic system such as discussed previously. The amount of information capable of being stored in a holographic medium is proportional to the product of: the refractive index contrast, Δn, of the photorecording material, and the thickness, d, of the photorecording material. (The refractive index contract, Δn, is conventionally known, and is defined as the amplitude of the sinusoidal variations in the refractive index of a material in which a plane-wave, volume hologram has been written. The refractive index varies as: $n(x)=n_0+\Delta n \cos(K_x)$, where n(x) is the spatially varying refractive index, x is the position vector, K is the grating wavevector, and $n_0$ is the baseline refractive index of the medium. See, e.g., P. Hariharan, *Optical Holography: Principles, Techniciues, and Applications*, Cambridge University Press, Cambridge, 1991, at 44.) The Δn of a material is typically calculated from the diffraction efficiency or efficiencies of a single volume hologram or a multiplexed set of volume holograms recorded in a medium. The Δn is associated with a medium before writing, but is observed by measurement performed after recording. Advantageously, the photorecording material of the invention exhibits a Δ of $3 \times 10^{-3}$ or higher.

Examples of other optical articles include beam filters, beam steerers or deflectors, and optical couplers. (See, e.g., L. Solymar and D. Cooke, *Volume Holography and Volume Gratings*, Academic Press, 315-327 (1981), the disclosure of which is hereby incorporated by reference.) A beam filter separates part of an incident laser beam that is traveling along a particular angle from the rest of the beam. Specifically, the Bragg selectivity of a thick transmission hologram is able to selectively diffract light along a particular angle of incidence, while light along other angle travels undeflected through the hologram. (See, e.g., J. E. Ludman et al., "Very thick holographic nonspatial filtering of laser beams," *Optical Engineering*, Vol. 36, No. 6, 1700 (1997), the disclosure of which is hereby incorporated by reference.) A beam steerer is a hologram that deflects light incident at the Bragg angle. An optical coupler is typically a combination of beam deflectors that steer light from a source to a target. These articles, typically referred to as holographic optical elements, are fabricated by imaging a particular optical interference pattern within a recording medium, as discussed previously with respect to data storage. Medium for these holographic optical elements are capable of being formed by the techniques discussed herein for recording media or waveguides.

The material principles discussed herein are applicable not only to hologram formation, but also to formation of optical transmission devices such as a waveguide and beam apodizer. Polymeric optical waveguides are discussed for example in B. L. Booth, "Optical Interconnection Polymers," in *Polymers for Lightwave and Integrated Optics, Technology and Applications*, L. A. Hornak, ed., Marcel Dekker, Inc. (1992); U.S. Pat. No. 5,292,620; and U.S. Pat. No. 5,219,710, the disclosures of which are hereby incorporated by reference. Essentially, the recording material of the invention is irradiated in a desired waveguide pattern to provide refractive index contrast between the waveguide pattern and the surrounding (cladding) material. It is possible for exposure to be performed, for example, by a focused laser light or by use of a mask with a non-focused light source. Generally, a single layer is exposed in this manner to provide the waveguide pattern, and additional layers are added to complete the cladding, thereby completing the waveguide. The process is discussed for example at pages 235-36 of Booth, supra, and Cols. 5 and 6 of U.S. Pat. No. 5,292,620. A benefit of the invention is that by using conventional molding techniques, it is possible to mold the matrix/photoimageable system mixture into a variety of shapes prior to matrix cure. For example, the matrix/photoimageable system mixture can be molded into ridge waveguides, wherein refractive index patterns are then written into the molded structures. It is thereby possible to easily form structures such as Bragg gratings. This feature of the invention increases the breadth of applications in which such polymeric waveguides would be useful.

In yet another aspect of the invention, the reference beam is a spherical beam. A "spherical beam" is a beam that results from light emitting from a point or small aperture. The propagating beam has a wavefront that consists of concentric spheres expanding outwards from the point of origin.

Figure 3:
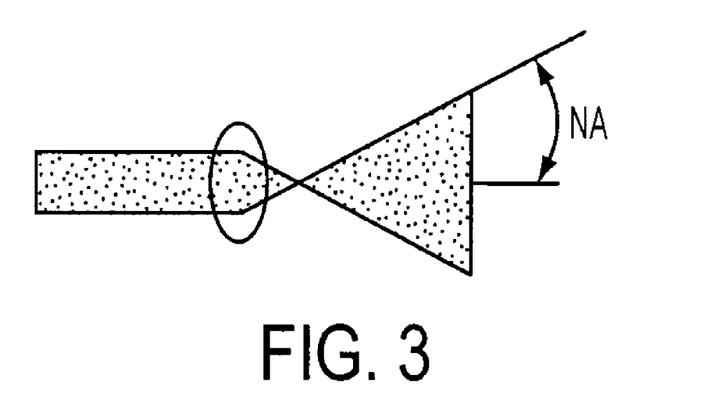
FIG. 3 shows the numerical aperture of an objective lens.

Preferably, a high numerical aperture (NA) objective lens generates the incident reference beam. The resultant beam is a spherical wave emanating from the focus point of the lens. The NA of the lens determines the angular spread of the propagating beam as shown in FIG. 3. The higher the NA, the larger the angular spread of the beam.

Preferably, the angle of the incident reference beam at an off-axis from the normal of a region of the medium is from about 10 degrees to about 60 degrees. More preferably, the angle of the incident reference beam is from about 20 degrees to about 50 degrees. Most preferably, the angle of the incident reference beam is from about 30 degrees to about 40 degrees.

The present invention will be better understood with reference to the following examples. These examples are intended to illustrate specific embodiments within the overall scope of the invention as claimed.

Figure 4:
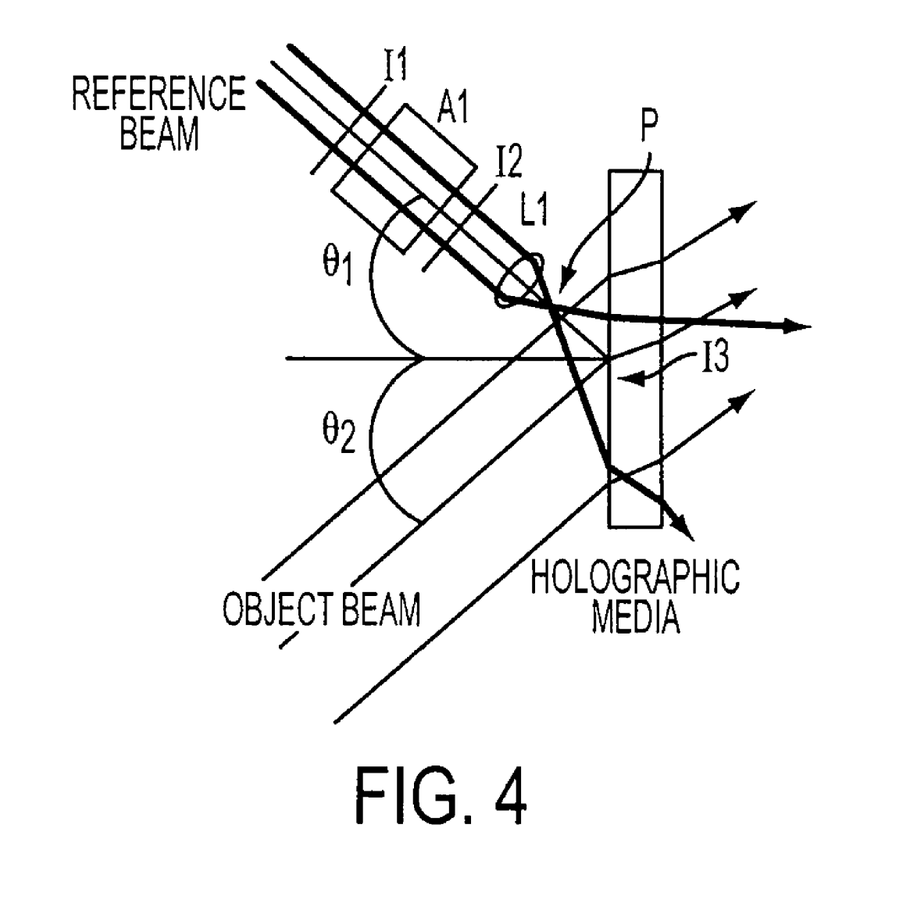
FIG. 4 shows an embodiment of an apodization system of this invention.

In one embodiment, an incident reference beam which is a spherical reference beam emanates from a point source 5 mm from the media and at an angle of $\theta_1=35$ degrees from the planar media normal. FIG. 4 illustrates the layout of this example system. The incident reference beam enters the optical system at entrance plane I1 where an apodizer (A1) modifies this beam. The beam exiting the apodizer (A1) is the modulated reference beam that traverses plane I2. The resultant intensity distribution in plane I2 enters the objective lens (L1) and is converted into a diverging spherical wave impinging on a region, here a planar region, of the media. The region could be on a surface of the media or within the media. The focus of the lens is the point P. The intensity distribution of the modulated reference beam on the planar region, which in FIG. 4 is the front surface of the media, is given by I3. Note that in FIG. 4, a plane and intensity distribution on the plane are both designated by the same identifier. For example, I3 refers to the intensity distribution on the plane I3 shown in FIG. 4.

Figure 5A:
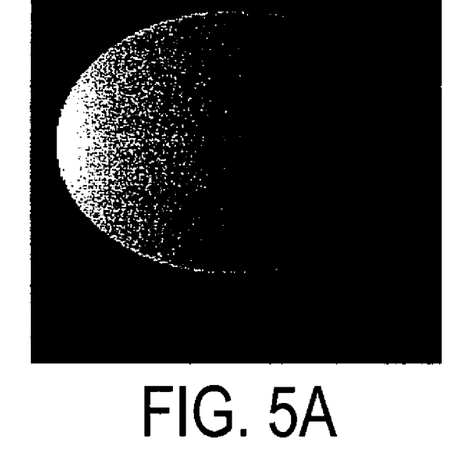
FIG. 5 shows the intensity of the reference beam on a region of a holographic recording medium without (FIG. 5(a)) and with (FIG. 5(b)) apodization.
Figure 5B:
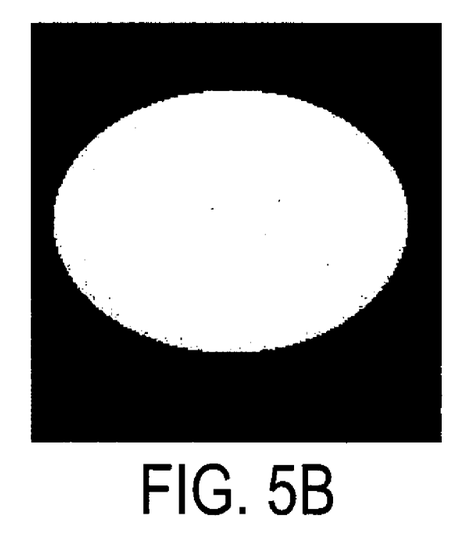

If the illumination at plane I1 would be perfectly uniform, then without an apodizer the intensity distribution I3 would be strongly non-uniform. The portion of the media closer to the focal point P would see a larger intensity than points farther away from P. FIG. 5 shows the intensity at plane I3 without (FIG. 5(a)) and with (FIG. 5(b)) correction by apodization.

Figure 6:
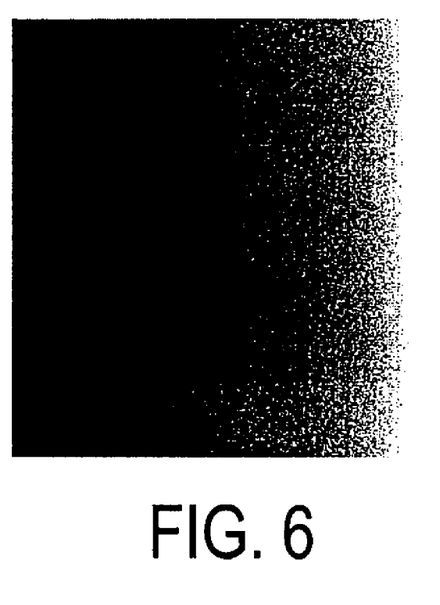
FIG. 6 shows an embodiment of an apodizer of this invention.

In order to correct the intensity distribution I3 to a uniform value, the apodizer A1 is constructed such that the modified intensity distribution I2 will propagate to the media and arrive at plane I3 uniformly. The necessary apodizer is shown in FIG. 6, where the dark shades indicate areas of low light transmission through the apodizer.

There are a number of ways to compute the necessary apodizer A1. For example, for each position in the plane I2, trace a number of rays onto the media plane I3. The ratio of the areas encompassed by the ray bundle in planes I3 and I2 is proportional to the change in the intensity. Let (x2,y2) denote a position on the plane I2, associated by ray-tracing to the point (x3,y3) on plane I3. Let the ratio of areas at positions (x2,y2) (x3,y3) be denoted by r(x3,y3)=area3(x3, y3)/area2(x2,y2). Since the desired goal is to uniformly illuminate the plane I3, set the apodization at the position (x3,y3) to be r(x3,y3). This method determines the desired apodizer transmittance. To implement the apodizer two approaches can be taken.

The first approach is an apodization system with a transmissive mask. When implementation simplicity is desired over power efficiency a transmissive mask can be used to produce the desired apodization function. Take the input intensity distribution at plane I1 and divide it point-wise through the image by the desired plane intensity I2. This ratio determines the necessary transmittance mask. (Because transmittance can not exceed unity, the mask is a passive component and does not generate light). Then, scale the transmittance of the whole mask by the largest transmittance value of the mask. The resultant mask has a maximum transmittance of unity and a minimum transmittance of zero. This re-scaling is the cause for the inefficient use of the input beam power.

To fabricate the transmittance mask, a number of convenient options are available. If the scale at which the transmittance function changes is on the order of hundreds of microns and the phase profile of the reference beam is not of interest, then a laser printer can be used to place the mask on a clear transparency. Alternatively, fabricate binary and grayscale masks by photolithography. In this case, the apodizer can be optically flat (no phase distortion) and also anti-reflection coated. The photolithography process can produce transmittance features on the order of microns with good accuracy.

In either of the mask fabrication methods, if a LaserJet transparency or photolithography produces the apodizer, the resultant mask is used in the system merely by placing it between planes I1 and I2. Alignment of the mask to the input beam could be required and can be done by adjusting the position of the mask until the intensity in plane I3 is measured to the desired uniformity specification.

The second approach is a diffractive apodization system, in which diffraction is used to move the optical power from regions that should be dark into neighboring regions that should be bright. A multi-element telescope with optical elements, for example, as shown in FIG. 2, could produce a highly efficient modulated reference beam with the capability of propagating for several meters with little distortion and diffraction-limited wavefront quality. The incident reference beam to modulated reference beam converter utilizes optical elements comprising lens, prisms, etc., to introduce aberrations into the incident reference beam, redistribute the incident reference beam power from a particular profile to the desired modulated reference beam profile. In this diffraction apodization system, an aspheric optic would collimate the aberrated incident reference beam and restore wavefront quality as that of the desired modulated reference beam. Fabrication of the elements for such a diffraction apodization system can be made using now available computer-controlled polishing technology and tested using computer-generated holograms.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire invention of the patents and publications referred in this application are hereby incorporated herein by reference.

What is claimed is:

1. An apodization system, comprising an apodizer for apodizing an incident reference beam and a holographic recording medium, wherein the apodizer produces a modulated reference beam having a substantially uniform intensity profile on a region of the holographic recording medium, the modulated reference beam is off-axis from normal at a point in the region and wherein the modulated reference beam is either converging or diverging at a point in the region.

2. The apodization system of claim 1, further comprising a light source for the incident reference beam and a light source for an object beam.

3. The apodizationsystem of claim 2, wherein the object beam contains encoded information and the incident reference beam is an unmodulated beam.

4. The apodization system of claim 1, wherein the apodizer comprises a transmissive mask.

5. The apodization system of claim 1, wherein the apodizer comprises a diffractive apodization system.

6. A method for apodizing an incident reference beam for a holographic recording medium, comprising impinging the incident reference beam on an apodizer and producing a modulated reference beam having a substantially uniform intensity profile on. a region of the holographic recording medium, wherein the modulated reference beam is off-axis from normal at a point in the region, the modulated reference beam is converging or diverging at a point in the region and further wherein the region comprises an overlap of the modulated reference beam and an object beam.

7. The method of claim 6, wherein the incident reference beam is a spherical beam.

8. The method of claim 6, wherein the modulated reference beam is a spherical beam.

9. The method of claim 6, wherein the region is a planar surface on or within the holographic recording medium.

10. The method of claim 6, wherein the holographic recording medium is an optically flat planar medium.

11. The method of claim 6, wherein the incident reference beam is a collimated beam having a substantially uniform intensity profile on a surface normal to the incident reference beam.

12. The method of claim 6, wherein the apodizer comprises a transmissive mask.

13. The method of claim 6, wherein the apodizer comprises a diffractive apodization system.

14. The method of claim 6, wherein the holographic recording medium is a holographic recording medium comprising a polymer matrix.

15. The method of claim 14, wherein the holographic recording medium has a Rayleigh ratio ($R_{90°}$) less than $7 \times 10^{-3}$ cm$^{-1}$.

16. The method of claim 14, wherein the holographic recording medium has a thickness greater than 200 μm and a Δn of $3 \times 10^{-3}$ or higher.

* * * * *